United States Patent [19]

McLaughlin et al.

[11] Patent Number: 4,908,900
[45] Date of Patent: Mar. 20, 1990

[54] FOLDING CLEANING TOOL

[76] Inventors: Daniel McLaughlin, 3950 Sir Wilfrid-Laurier, #606, St-Hubert (Qué) J3Y 5Y9; Jean-Marie Allard, 3750 Chemin du Souvenir, #3, Chomedey Laval (Qué) H7V 1X8, both of Canada

[21] Appl. No.: 236,812

[22] Filed: Aug. 26, 1988

[30] Foreign Application Priority Data

Sep. 1, 1987 [GB] United Kingdom ............... 8720564

[51] Int. Cl.⁴ ........................ A47L 13/12; A47L 1/06
[52] U.S. Cl. ........................ 15/111; 15/105; 15/117; 15/144 R; 15/160; 15/172
[58] Field of Search ............. 15/105, 111, 117, 144 R, 15/160, 172

[56] References Cited

U.S. PATENT DOCUMENTS

| | | | |
|---|---|---|---|
| 1,439,913 | 12/1922 | Saxe | 15/172 |
| 2,614,281 | 10/1952 | Clark . | |
| 2,741,790 | 4/1956 | Koehring . | |
| 2,756,453 | 7/1956 | Mattson | 15/160 |
| 2,799,037 | 7/1957 | Grogan | 15/172 |
| 2,832,980 | 5/1958 | O'Neill . | |
| 2,856,621 | 10/1958 | Racicot . | |
| 2,860,360 | 11/1958 | Leavelle | 15/160 |
| 2,867,827 | 1/1959 | Gantz . | |
| 2,896,241 | 7/1959 | Cotman . | |
| 3,017,649 | 1/1962 | Racicot . | |
| 3,036,322 | 5/1962 | Jorgensen . | |
| 3,051,975 | 9/1962 | Schwartz . | |
| 4,041,564 | 8/1977 | Schlichter . | |
| 4,281,433 | 8/1981 | Sendoykas | 15/117 |

FOREIGN PATENT DOCUMENTS

| | | |
|---|---|---|
| 273769 | 9/1927 | Canada . |
| 614118 | 2/1961 | Canada . |
| 1158007 | 12/1983 | Canada . |

*Primary Examiner*—Harvey C. Hornsby
*Assistant Examiner*—M. Spisich
*Attorney, Agent, or Firm*—Edwin E. Greigg

[57] ABSTRACT

A cleaning tool particularly for removing snow and ice from cars and other vehicles has brushes which can be disposed perpendicularly or parallel to the tool handle. A handle mounted device allows easy interchange from one position to the other.

9 Claims, 2 Drawing Sheets

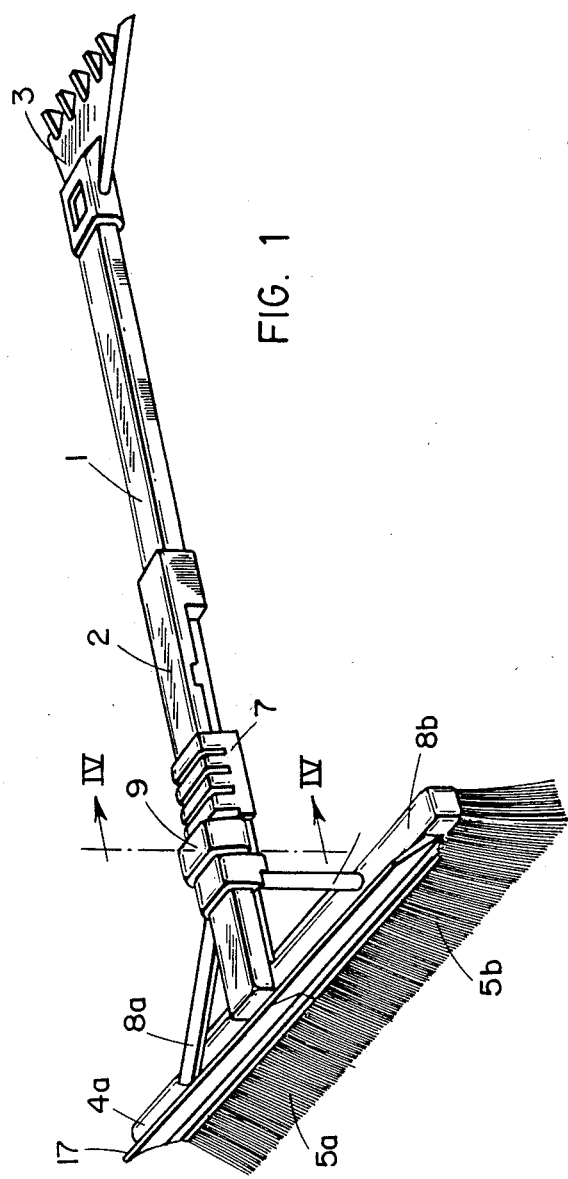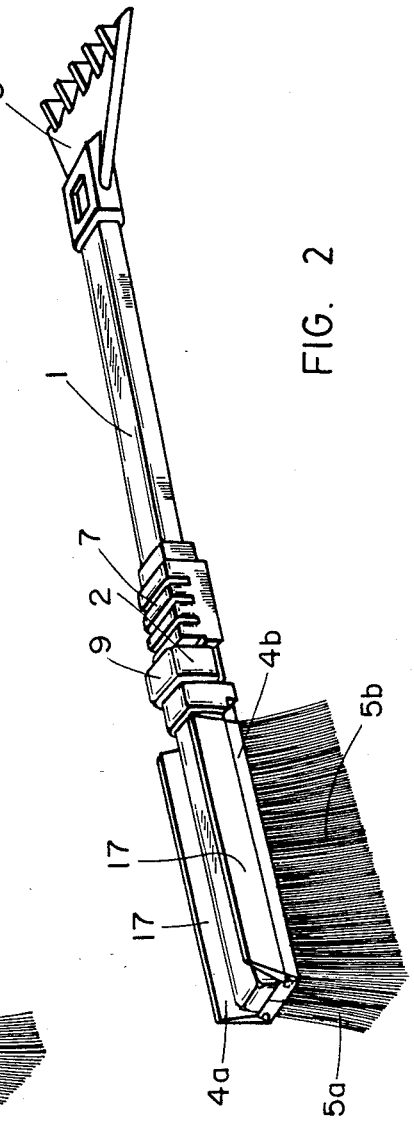

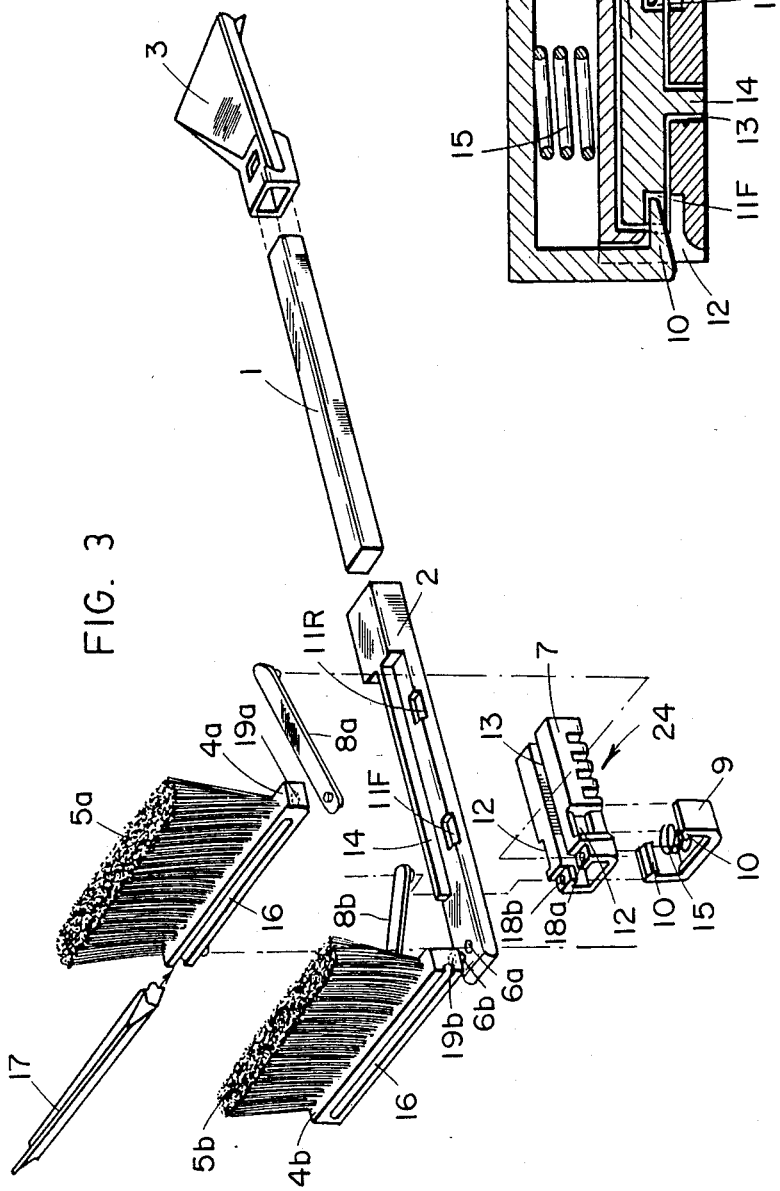

FOLDING CLEANING TOOL

BACKGROUND OF THE INVENTION (a) Field of the invention

This invention relates to a cleaning tool for the removal of debris from surfaces, particularly snow and ice from vehicles such as cars in the winter. The tool according to the invention has a brush which may be conformed in a T-shaped mode or in longitudinal mode.

(b) Description of the prior art

Hiterto, it has been common to mount a scraper on the end of a handle carrying a brush on the other end to form a tool which may be used for removing snow either by brushing or scraping from snow covered surfaces.

U.S. Pat. Nos. 3,036,322, 3,017,649, 2,896,241, 3,051,975 relate to snow and ice removal equipment combining brushes with scrapers in various configurations including extensible handle portions and collapsible designs for easy storage.

U.S. Pat. No. 2,832,980 relates to a bladed instrument where the single blade is foldable from a parallel to a perpendicular position.

U.S. Pat. No. 4,041,654 relates to an extensible brush tool where the brush remains parallel to the handle.

In the brush art, U.S. Pat. No. 2,614,281 shows a two-bladed V-shaped brush whose angle of operation is controllable by dual handles connected to the brushes by a complex hinge mechanism.

In the mop art, U.S. Pat. No. 2,741,790 shows a collapsible mop which allows a mop cloth to be easily placed in a conventional wringer, and then be expanded to a maximum position. A handle mounted actuator causes a mop to move from a position of minimum stretching of the cloth to a maximum position.

Canadian Patent No. 614,118 shows a mop head comprising a universal connection between a head and handle but restricting pivotal movement to one axis. The two blades of the mop are collapsible from a T-shape to a longitudinal shape and are locked in the T-shape by locking means on the blade. When the mop is removed, the blades fold under their own weight.

Canadian Patent No. 273,769 describes a brush of variable width using hinged elements to reduce the width where necessary.

Canadian Patent No. 1,158,007 describes a snow removal tool having a brush which may be assembled either in a T-shaped mode or in one of two longitudinal modes. Intermodal change requires disassembly.

OBJECTS OF THE INVENTION

It is apparent from the foregoing that it is desirable to have a collapsible cleaning tool for economy of storage space while achieving a brush usable in longitudinal mode (where the bristles of the brush are parallel to the brush handle) or in T-shaped mode where the bristles of the brush are perpendicular to the brush handle.

The object of the present invention is to provide such a cleaning tool which is both simple to construct and to operate while achieving the advantages of a T-shaped brush at the same time as those of a longitudinal brush.

Another object is to provide such a tool having a handle-mounted means for reversibly moving brush carrying elements from a T-shaped to a longitudinal position.

SUMMARY OF THE INVENTION

In meeting this and other objects, the present invention provides a cleaning tool comprising:

a handle having a central portion and first and second end portions;

a pair of arms carrying brushes thereunder, each such arm having two ends, one end of each arm being pivotally attached on the first end portion of the handle so as to allow reversible movement of the arms from a position where the arms are parallel to the handle, to a position where the arms are perpendicular to the handle;

means mounted on the handle for reversibly moving the arms from the parallel to the longitudinal position; and means for reversibly retaining the arms in one of the above-mentioned positions.

The invention makes available a much larger brush width for rapid removal of snow or other debris while the same brush may be collapsed to occupy much the same space as conventional brushes.

BRIEF DESCRIPTION OF THE DRAWINGS

In what follows, the same reference numerals apply to all figures. The figures illustrate non-limitative embodiments of the invention.

FIG. 1 is a perspective view of one embodiment of the present invention in perpendicular mode;

FIG. 2 shows the same embodiment as FIG. 1 but in longitudinal mode;

FIG. 3 shows an exploded perspective view of a second embodiment according to the invention; and FIG. 4 is a cross-section along a line IV—IV of FIG. 1.

DESCRIPTION OF A PREFERRED EMBODIMENT

The handle of the tool conveniently comprises three parts namely a central portion 1, a first end portion 2 and a second end portion 3. A pair of arms 4a and 4b carry brushes 5a and 5b respectively thereunder. One end of each arm 4a and 4b is pivotally attached on the first end portion 2 of the handle at positions 6a and 6b respectively. This allows reversible movement of the arms from a position where the arms 4a and 4b are parallel to the handle (FIG. 2) to a position where the arms 4 are perpendicular to the handle (FIG. 1).

The central portion 1 of handle is preferably made of wood.

The second end portion 3 is preferably a scraper having a slight gradient so that its blade is slightly lower than the surface of the handle.

On the handle, there is a means for effecting the above-mentioned reversible movement (from parallel to perpendicular positions and vice versa) which in the figures comprises a collar 7 which is slidably mounted about the first end portion 2 of the handle to allow reversible longitudinal motion.

A pair of struts 8a and 8b are mounted between each arm 4a and 4b and the collar 7. The struts 8a and 8b are pivotally mounted at each end thereof, for example in holes 18a and 18b in the collar 7 (at one end) and in holes 19a and 19b preferably midway along each arm 4a and 4b, respectively (at the other end).

There is also a means for retaining the collar in one of two longitudinal positions, namely a forward position and a rearward position. The forward position corresponds to the brushes being "open" i.e. perpendicular to the handle, while the rearward position corresponds to the brushes being "closed" i.e. in the parallel position.

The retaining means is preferably a rigid U-shaped clip 9 which has teeth 10 at the extremities of the leg portion of the clip 9. These teeth 10 are locatable in one of two pairs of longitudinal slots 11F and 11R. The slots are symmetrically disposed, i.e. bilaterally to the first end portion 2 of the handle. The forward pair of slots 11F defines the position of the collar 7 when the brushes 5 are in the "open" position, while rearward pair of slots 11R define the position of the collar 7 when the brushes 5 are in their "closed" position.

The collar 7 has two cut out portions 12 on either side to accommodate the clip 9 which retains the collar 7 in sliding relationship with the first end portion 2 of the handle.

Furthermore, the collar 7 has a longitudinal, central slot 13 which accommodates a corresponding longitudinal raised rib 14 on the first end portion 2 of the handle. This acts as a guide means to allow guided longitudinal movement of the collar 7 on the first end portion 2 of the handle.

The struts 8a and 8b are mounted on the collar at its forward extremity to avoid ensnarement with the user's hand.

The clip 9 is then attached rearward of these struts attachement points while there is a hand-gripping portion 24 on the collar to improve purchase.

The clip 9 also comprises a spring 15 on the inner surface of the bridge portion of the clip 9. When assembled, the spring abuts the collar (see FIG. 4) and retains the collar 7 in position on the first end portion 2 of the handle. Depression of the bridge portion of the clip 9 results in disengagement of the two teeth of the U-shaped clip from the slot 11 to allow longitudinal movement of the collar 7 to change the mode of brush use.

The arms 4a and 4b from which project the brushes 5a and 5b also contain grooves 16 for the retention of squeegees 17 for removal of condensation from windows or removal of ice or other desired activity.

Both the end portions 2 and 3 have female receiving portions to accommodate the central handle portion 1.

Although the present invention has been described hereinabove by means of preferred embodiments thereof, it should be pointed out that any modification to these preferred embodiments, within the scope of the appended claims, is not deemed to change or alter the nature of the invention.

We claim:
1. A cleaning tool comprising:
an elongated handle having a central portion and first and second end portions:
a pair of arms, each of said arms carrying a brush thereunder with each said brush extending along the length of each of said arms, each arm having two ends, one end of each arm being pivotally attached on one surface of the first end portion of the handle so as to allow movement of said arms about their pivot from a position where said arms and said brushes are parallel to said handle to a position where said arms and said brushes are perpendicular to said handle;
means mounted on the handle for moving said arms and said brushes from said parallel position to said perpendicular position; and
a retainer means for retaining said arms and said brushes in each of said parallel and perpendicular positions.

2. A cleaning tool according to claim 1, wherein said means mounted on said handle for moving said arms and said brushes from said parallel to said perpendicular position comprises:
a collar slidably mounted along said first end portion of the handle for a longitudinal motion relative to said first end portion; and
a pair of struts each having first and second ends, said first end pivotally mounted on each arm, and spaced from said pivotal attachment of said arms to said first end portion of said handle, and a second end pivotally mounted on said collar.

3. A cleaning tool according to claim 2, wherein said first end portion of said handle comprises:
a forward and rearward pair of bilateral, longitudinal slots;
a rigid U-shaped clip having a bridge portion and two legs, each of said legs having teeth at respective ends thereof locatable in one of the forward pair of slots to achieve said perpendicular position or the rearward pair of slots to achieve said parallel position of said pair of arms and brushes; and
said collar has cut-out portions to accommodate said teeth on said legs, and said clip retains said collar in a sliding and fixed relationship with said first end portion of the handle.

4. A cleaning tool according to claim 3, wherein said clip additionally comprises, in said bridge portion, a spring which abuts said collar such that in a rest position said teeth engage said slots in said first portion of said handle while depression of the bridge portion causes disengagement of said teeth from said slots.

5. A cleaning tool according to claim 4, wherein said first end portion of said handle further comprises a longitudinal, raised rib engageable with a corresponding longitudinal slot in said collar for guided movement of said collar along said first end portion of said handle.

6. A cleaning tool according to claim 4, wherein said pivotal mounts on the collar are forward of said clip which is forward of a hand gripping portion of said collar.

7. A cleaning tool according to claim 4, wherein said second end portion comprises a scraper.

8. A cleaning tool according to claim 4, wherein each of said arms additioally comprise a groove for retention of a squeegee.

9. A cleaning tool according to claim 8, wherein each of said arms additionally comprise a squeegee in said groove therein.

* * * * *